United States Patent [19]

Baumann et al.

[11] Patent Number: 5,279,292
[45] Date of Patent: Jan. 18, 1994

[54] CHARGING SYSTEM FOR IMPLANTABLE HEARING AIDS AND TINNITUS MASKERS

[75] Inventors: Joachim Baumann, Munich; Hans Leysieffer, Taufkirchen; Guenter Hortmann, Neckartenzlingen, all of Fed. Rep. of Germany

[73] Assignee: Implex GmbH, Neckartenzlingen, Fed. Rep. of Germany

[21] Appl. No.: 834,838

[22] Filed: Feb. 13, 1992

[30] Foreign Application Priority Data

Feb. 13, 1991 [DE] Fed. Rep. of Germany ....... 4104359

[51] Int. Cl.$^5$ ............................................. A61N 1/00
[52] U.S. Cl. ...................................... 607/137; 607/57; 607/61; 607/65
[58] Field of Search .................. 128/420.5, 420.6, 419; 381/60, 23.1; 600/25

[56] References Cited

U.S. PATENT DOCUMENTS

| | | | |
|---|---|---|---|
| 2,640,099 | 5/1953 | Hull | 381/60 X |
| 3,764,748 | 10/1973 | Branch et al. | 128/420.6 |
| 3,942,535 | 3/1976 | Schulman | 128/419 PS |
| 4,014,346 | 3/1977 | Brownlee | 128/419 PS |
| 4,049,930 | 9/1977 | Fletcher et al. | 381/60 |
| 4,134,408 | 1/1979 | Brownlee et al. | 128/419 PS |
| 4,222,393 | 9/1980 | Hocks et al. | 128/746 |
| 4,275,739 | 6/1981 | Fischell | 128/419 PS |
| 4,408,607 | 10/1983 | Maurer | 128/419 PS X |
| 4,665,896 | 5/1987 | LaForge et al. | 128/419 PS X |
| 4,741,339 | 5/1988 | Harrison et al. | 128/420.5 X |
| 4,918,745 | 4/1990 | Hutchinson | 128/420.5 X |

FOREIGN PATENT DOCUMENTS

| | | |
|---|---|---|
| 0242038 | 10/1987 | European Pat. Off. . |
| 1940803 | 9/1974 | Fed. Rep. of Germany . |
| 3840393 | 6/1989 | Fed. Rep. of Germany . |
| 3918086 | 9/1990 | Fed. Rep. of Germany . |
| 670349 | 5/1989 | Switzerland . |

Primary Examiner—Lee S. Cohen
Assistant Examiner—Jeffrey R. Jastrzab
Attorney, Agent, or Firm—Sixbey, Friedman, Leedom & Ferguson

[57] ABSTRACT

Charging system for implantable hearing aids and tinnitus maskers with a repeatedly rechargeable direct voltage source. The charging system comprises an implantable receiving resonant circuit as the electrical energy source for the direct voltage source to be charged and a transmitting resonant circuit located outside the body that can be inductively coupled with the receiving resonant circuit for power transmission from outside the body to inside the body. Embodiments are provided for transcutaneous and for percutaneous power transmission between the implantable receiving resonant circuit and the external transmitting resonant circuit.

16 Claims, 4 Drawing Sheets

CHARGING SYSTEM FOR IMPLANTABLE HEARING AIDS AND TINNITUS MASKERS

BACKGROUND OF THE INVENTION

The invention relates to a charging system for implantable hearing aids and tinnitus maskers with a repeatedly rechargeable direct voltage source.

Charging systems for the batteries of pacemakers are known, for example, from German Offenlegungsschrift No. 19 40 803 or U.S. Pat. No. 4,134,408. The process used in these systems for inductive power transmission is based on two coupled coils, similar to a transformer, one of the coils being implanted and the other coil being brought externally near the implanted coil. The implanted coil directly supplies, in a broadband way, a rectifier circuit. Because of the poor coil coupling, this type of power transmission allows only relatively limited charging currents for the battery. These were sufficient for the batteries of pacemakers since, for the operation of a pacemaker, only a small amount of power is needed, and thus, one can make do with limited battery ampere-hour capacities. In contrast, the operation of a hearing aid or a tinnitus masker has a significantly higher power requirement, since these devices are permanently active.

An implantable hearing device with a repeatedly rechangeable direct voltage source is known from German Patent 39 18 086 C1. But, the charging system for the direct voltage source is not explained there.

SUMMARY OF THE INVENTION

The object of the invention is to provide a charging system for the batteries of implanted hearing aids that makes the necessary charging currents reliably available.

This object is achieved according to the invention with a charging system of the above-mentioned type that comprises an implantable part with an input resonant circuit, which serves as the electrical energy source for the direct voltage source to be charged, and a part located outside the body with a transmitting resonant circuit that can be inductively coupled with the receiving resonant circuit for power transmission from outside the body to inside the body.

Resonant coupling of the coils of the transmitting resonant circuit and of the receiving resonant circuit makes possible considerably improved power transmission, compared to a broadband coupling, so that the necessary charging currents are available for the battery ampere-hour capacities of a hearing aid or of a tinnitus masker. The external part of the charging system can be made stationary and connected to the power supply or, preferably, as a small, portable device with rechargeable batteries.

By directly placing the external part of the charging system on the surface of the body, a transmitting coil of the transmitting resonant circuit can be brought to overlap a receiving coil of the implantable receiving resonant circuit, advantageously concentrically, for power transmission through the closed skin (transcutaneously) from outside the body to inside the body. This embodiment is preferred when the (external) part of the charging system located outside the body is made as a small, portable and thus nonstationary device, and the transmitting power must be minimized. Placement of the transmitting coil without direct contact with the surface of the body at a certain distance from the surface of the body is preferred when the external part of the charging system is made stationary and connected to the power supply, and thus greater transmitting power is available that makes possible a contactless recharging of the implanted direct voltage source, e.g., during sleep. Advantageously, the implantable part of the charging system is provided with a telemetry circuit to obtain data on the position of the transmitting coil relative to the receiving coil and/or on the charging state of the direct voltage source. According to another embodiment of the invention, the receiving coil has a ferrite core projecting above the coil. The projecting end of the ferrite core can extend through the skin to the outside for inductive and mechanical coupling with the transmitting coil. Thus, there exists the choice between an implantable power supply part that is not evident at all externally and a charging system that is even more powerful for power transmission with an externally evident ferrite core as a coupling element between the transmitting and receiving coil. The implantable part of the charging system is, advantageously, equipped with an electronic circuit that controls or monitors the charging or discharging process of the direct voltage source.

The receiving resonant circuit, a charging electronic device and the direct voltage source can be incorporated together with the hearing aid or with the tinnitus masker in a common housing. But, since the nickelcadmium storage batteries with button cell design that are now especially suitable for hearing aids have only an average service life of five years, the direct voltage source can, instead, also be incorporated in a separate housing and be detachably, galvanically connected to the hearing aid or tinnitus masker. In this way, when the battery is replaced, a replacement of the entire system can be avoided.

The implantable part of the charging system can be designed for implantation in the head area of the patient, preferably in the mastoid.

The placement of a warning device in the implantable part of the charging system to feed warning signals into the signal path of the hearing aid or tinnitus masker as soon as the charging state of the direct voltage source reaches a minimum level is also advantageous. The wearer of the hearing aid is, thus, made aware by acoustic signals that he must recharge the direct voltage source of his device.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENT

Figure 1:
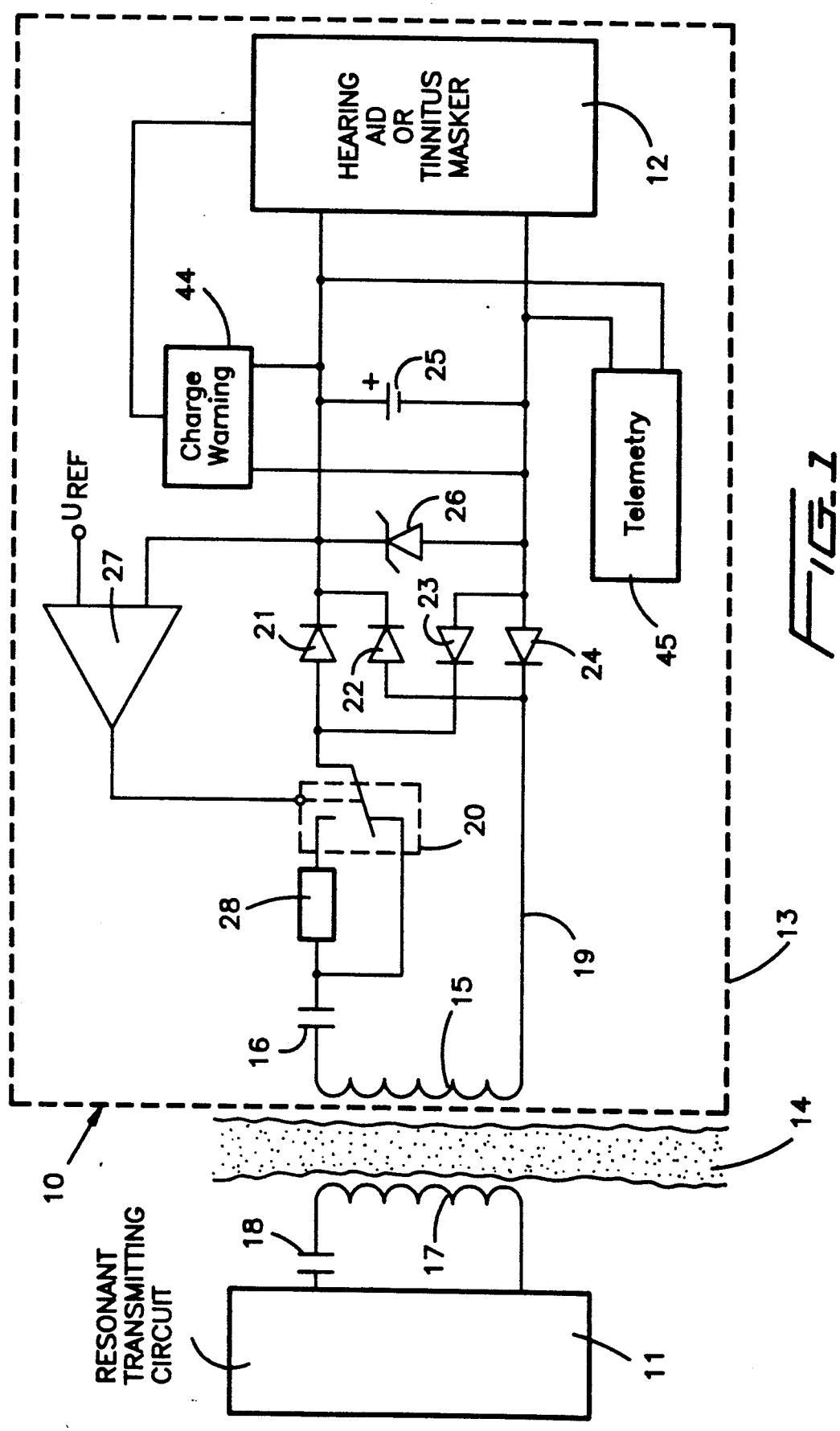
FIG. 1 is a circuit diagram of a transcutaneous power transmission charging system in accordance with the present invention.

The charging system represented in FIG. 1 comprises an implanted receiving part 10 and an external transmitting part 11. Receiving part 10 is incorporated together with a hearing aid 12 in a housing 13 placed under the skin 14 of the user's body. Receiving part 10 comprises a receiving coil 15 which, together with a capacitor 16, forms a series resonant circuit that is activated by a second series resonant circuit located in transmitting part 11 of the charging system. Transitting part 11 comprises a transmitting coil 17 and a capacitor 18 having equal resonant ranges. Receiving coil 15 and capacitor 16 are parts of an alternating current charging circuit 19 that is closed, as represented in FIG. 1, by a switch 20 and, depending on the phase, by diodes 21, 24 or 22, 23 and a direct voltage source 25. A Zener diode 26 protects direct voltage source 25 and the following circuit of hearing aid 12 from too high a voltage of charging circuit 19. The level of current induced in receiving coil 15 depends on the amount of ohmic resistances present in charging circuit 19, such as the winding resistance of receiving coil 15, the differential resistances of diodes 21 to 24 and the internal resistance of direct voltage source 25. Since the internal resistance of direct voltage source 25 is negligibly small compared to the other resistances, a current injection into direct voltage source 25 occurs. The voltage of direct voltage source 25 is monitored during charging by a comparator 27. When a set voltage value is reached, an additional resistance 28 is looped by switch 20 into charging circuit 19, which limits the charging current.

In the embodiment illustrated in FIG. 1, a warning device 44 is further provided that feeds warning signals into the signal path of hearing aid 12 as soon as the charging state of direct voltage source 25 falls below a predetermined minimum level. Additionally, or instead of that, a telemetry circuit 45 can be provided that transmits data about the charging state of direct voltage source 25 to the outside.

Figure 2:
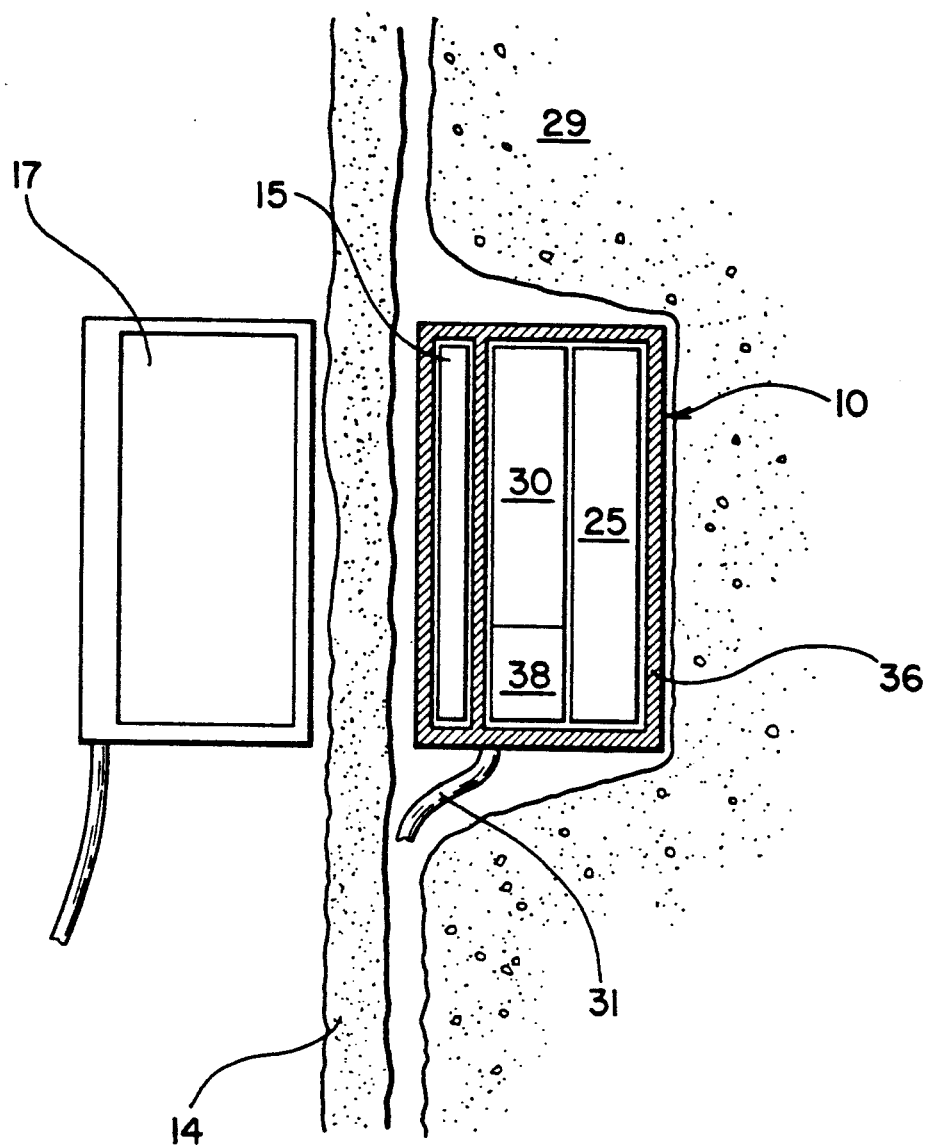
FIG. 2 is a diagrammatic section through a transcutaneous power transmission charging system.

The sectional diagram according to FIG. 2 also shows a charging system for transcutaneous power transmission; but, in contrast to the embodiment of FIG. 1, here, the receiving part 10 of the charging system is not incorporated into the same housing as the hearing aid, and has a separate housing 36 instead. Housing 36, implanted in mastoid 29, contains receiving coil 15, a charging electronic device 30 which, for example, includes components 20 to 24 and 26 to 28 of FIG. 1, as well as direct voltage source 25. The latter is connected by a connection cable 31 to the hearing aid, which is not represented in FIG. 2. In this way, the hearing aid can be placed in the ear itself and the implantable power supply unit of the hearing aid can be placed in a more accessible place, for example in a recess of the mastoid behind the ear. To charge direct voltage source 25, transmitting coil 17 is brought, outside skin 14, to concentrically overlap the receiving coil. To monitor the position of transmitting coil 17, acting as a primary coil, relative to receiving coil 15, forming the secondary coil, a telemetry circuit 38 that externally delivers a signal indicating the mutual alignment of coils 15, 17 can be allocated to charging electronic device 30.

Figure 3:
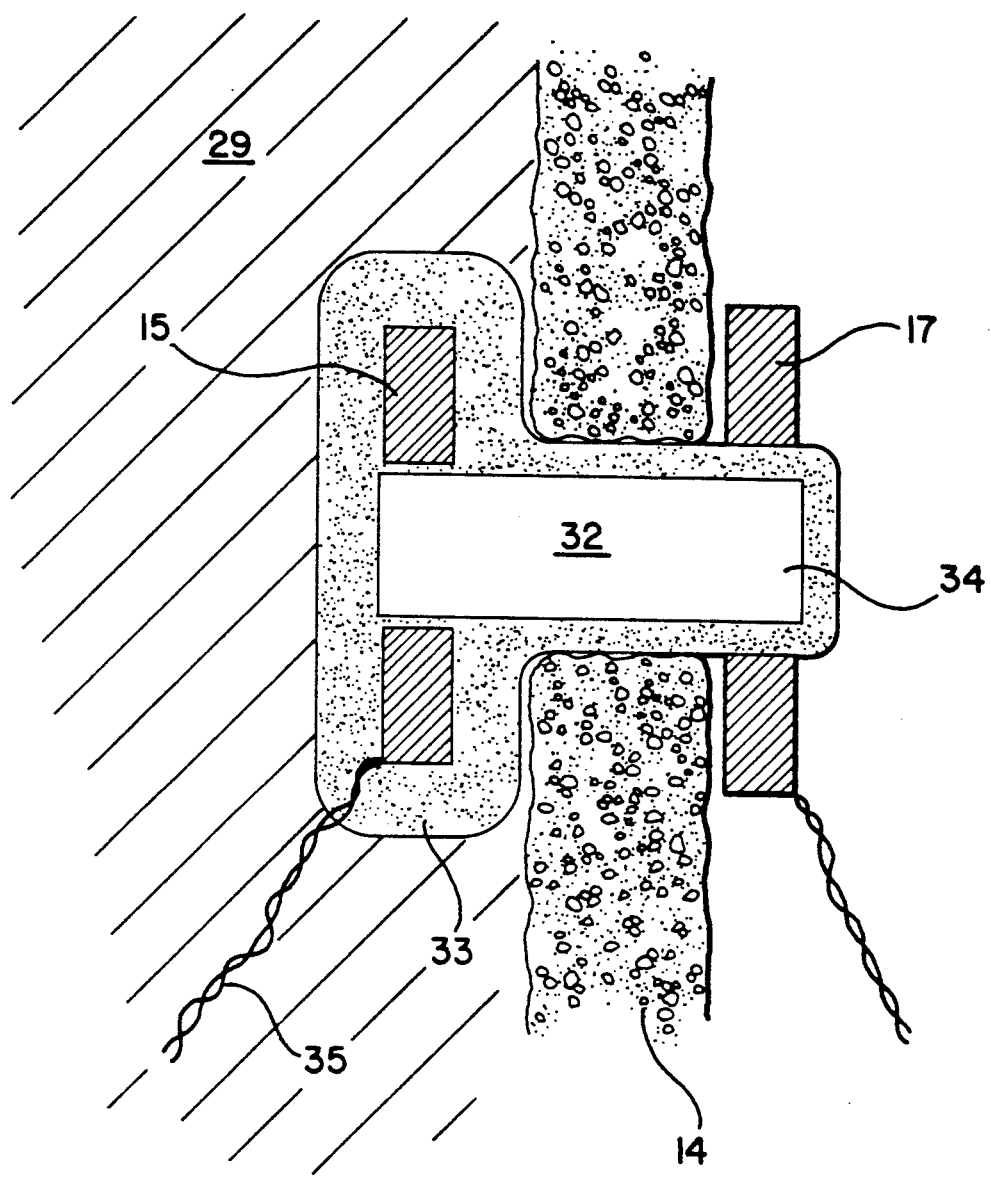
FIG. 3 is a diagrammatic section through a receiving and transmitting coil of a percutaneous power transmission charging system in accordance with the present invention.

FIG. 3 shows an enlarged sectional representation, corresponding to that of FIG. 2 for percutaneous power transmission. Receiving coil 15 is implanted under skin 14 in mastoid 29. Coil 15 comprises a ferrite core 32 having an end 34 that projects beyond coil 15, through skin 14, to the outside. Receiving coil 15 and ferrite core 32 are completely surrounded with biocompatible material 33. To charge the direct voltage source of a hearing aid connected by leads 35 to receiving coil 15, transmitting coil 17 is placed over the outer end 34 of ferrite core 32. Ferrite core 32 thus acts to mechanically fix transmitting coil 17 and to magnetically couple both coils 15 and 17. Such a percutaneous power transmission is more effective than transcutaneous transmission. The ferrite core end 34 that projects from the skin can be made small and unobtrusive and be placed at a concealed spot, in particular behind the external ear.

Figure 4:
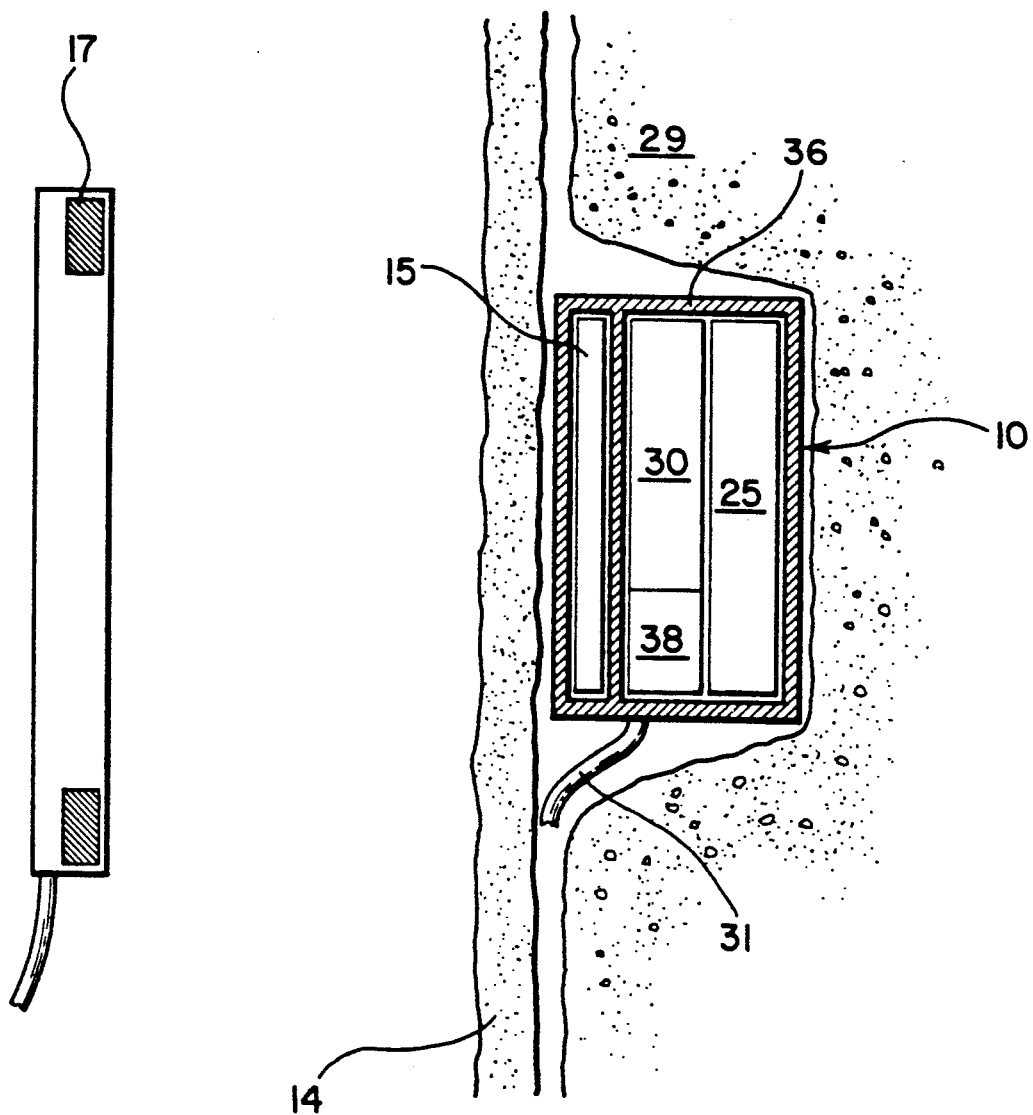
FIG. 4 is a diagrammatic representation of a contactless, inductive coupling between an external transmitting coil near the surface of a user's body and an internal, implanted power receiving device.

FIG. 4 shows another embodiment transcutaneous charging of the direct voltage source. In contrast to the embodiment of FIG. 2, transmitting coil 17 of the external part of the charging system does not lie directly on the surface of the body (skin 14), but is located at a certain distance from the part of the surface of the body under which the power-receiving part of the charging system (power receiving coil 15, charging electronic device 30 and direct voltage source 25) is implanted. This embodiment is suitable when the external part of the charging system can be operated in a stationary way, and thus, connected to the power supply, higher transmitting power is available that permits an inductive power transmission over longer distances. When the transmitting coil is embedded in a suitably configured sheathing, a charging system can be made, for example, that makes possible a contactless recharging of the implanted direct voltage source during sleep. Then, a concentric overlapping of the transmitting and receiving coils, as is represented in FIG. 2, is not necessary if a suitable geometry is given to transmitting coil 17 (e.g., ellipsoid loop shape with clearly larger geometric dimensions than receiving coil 15), as long as receiving coil 15 is located in the main field of magnetic induction.

Device 12, incorporated in housing 13 or 36, can be a tinnitus masker instead of a hearing aid. While series resonant circuits are provided above, basically, it is also possible to work with parallel resonant circuits.

While we have shown and described various embodiments in accordance with the present invention, it is understood that the same is not limited thereto, but is susceptible of numerous changes and modifications as known to those skilled in the art. Therefore, we do not wish to be limited to the details shown and described herein, and intend to cover all such changes and modifications as are encompassed by the scope of the appended claims.

We claim:

1. Charging system for implantable hearing aids and tinnitus maskers, comprising an implantable part with a repeatedly rechargeable battery direct voltage source, a receiving series-resonant circuit serving as a constant current source for the direct voltage source to be charged and a full-wave rectification diode bridge circuit having pairs of diodes, and an external part adapted to be located outside a user's body, having a transmitting series-resonant circuit which is inductively couplable with the receiving series-resonant circuit for power transmission from outside the user's body to inside the user's body, said receiving series-resonant circuit comprising a receiving coil and a capacitor connected in series with each other and with said direct voltage source, said receiving coil and said capacitor being parts of a current charging circuit that is closed by a respective one of said pairs of diodes of the full-wave rectification diode bridge circuit depending on a phase of charging current flowing in said current charging circuit.

2. Charging system according to claim 1, wherein said transmitting series-resonant circuit has a transmitting coil, and wherein, for transcutaneous power transmission through closed skin from outside the user's body to inside of the user's body, said transmitting coil of the transmitting series-resonant circuit is placeable directly on the surface of the skin, in overlapping relationship to said receiving coil of the implantable receiving series-resonant circuit.

3. Charging system according to claim 1, wherein the transmitting series-resonant circuit has a transmitting coil for transcutaneous power transmission through closed skin from outside the user's body to inside the user's body without being in direct contact with the surface of the user's body near said receiving coil of the implantable receiving series-resonant circuit.

4. Charging system according to claim 1, wherein said transmitting series-resonant circuit has a transmitting coil, and wherein said receiving coil of the receiving series-resonant circuit has a ferrite core with a projecting end that is adopted to extend beyond the receiving coil, through the skin to outside of the user's body, as a percutaneous means for inductive and mechanical coupling with a transmitting coil of the transmitting series-resonant circuit.

5. Charging system according to claim 1, wherein the charging system has a telemetry-circuit for obtaining data on the position of a transmitting coil of the series resonant circuit relative to a receiving coil of the receiving series resonant circuit.

6. Charging system according to claim 1, wherein the charging system has a telemetry circuit means for obtaining data on a charging state of the direct voltage source.

7. Charging system according to claim 1, wherein the implantable part of the charging system contains an electronic means for controlling and monitoring charging or discharging of the direct voltage source.

8. Charging system according to claim 1, wherein the receiving series-resonant circuit, the diode bridge circuit and the direct voltage source are incorporated together in a common housing for association with a hearing aid.

9. Charging system according to claim 1, wherein the direct voltage source is incorporated in a housing that is adapted to be detachably, galvanically connected to a hearing aid.

10. Charging system according to claim 1, wherein the direct voltage source, in combination with the receiving series-resonant circuit and the diode bridge circuit, is adopted to be detachably, galvanically connected to a hearing aid in a separate housing therefrom.

11. Charging system according to claim 1, wherein the implantable part of the charging system is of a size and shape suitable for implantation in an area of a head area of the user's body.

12. Charging system according to claim 11, wherein the implantable part of the charging system is of a size and shape suitable for implantation in a mastoid.

13. Charging system according to claim 1, wherein the implantable part of the charging system comprises a warning device having means for feeding warning signals into a signal path of a hearing aid as soon as the direct voltage source has a charge level below a minimum level.

14. Charging system according to claim 1, wherein the series receiving resonant circuit, the diode bridge circuit and the direct voltage source are incorporated together in a common housing for association with a tinnitus masker.

15. Charging system according to claim 1, wherein the direct voltage source is adapted to be detachably, galvanically connected to a tinnitus masker in a separate housing therefrom.

16. Charging system according to claim 1, wherein the implantable part of the charging system comprises a warning device having means for feeding warning signals into a signal path of a tinnitus masker as soon as the direct voltage source has a charge level below a minimum level.

* * * * *